Dec. 23, 1941.  H. MORETTI  2,267,126
SPOOL
Filed July 18, 1940
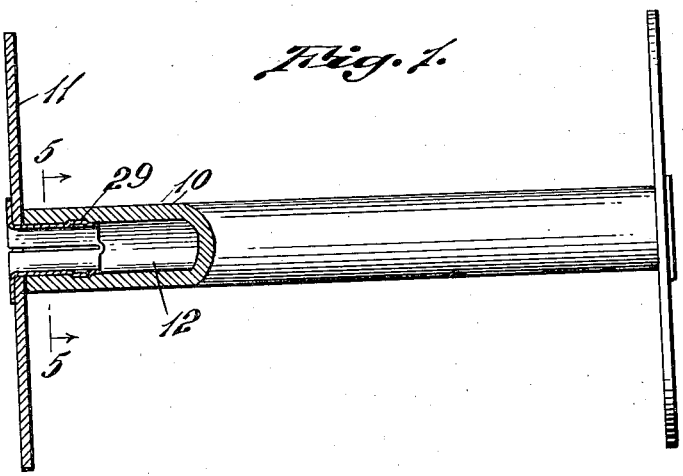
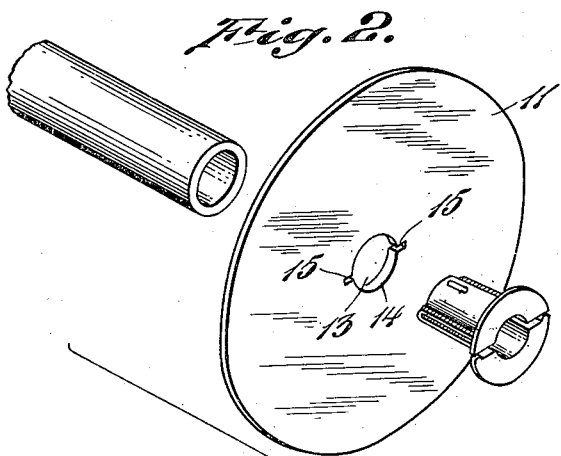
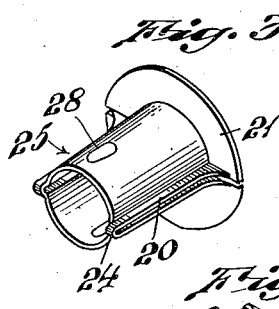
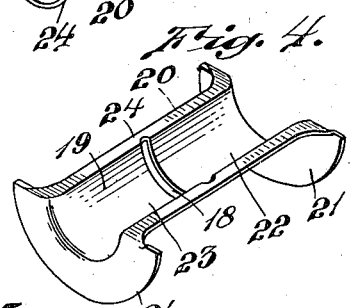
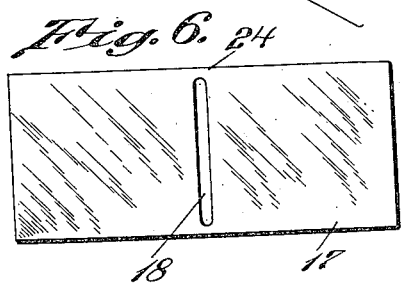
INVENTOR.
Henry Moretti
BY Barlow & Barlow
ATTORNEYS.

Patented Dec. 23, 1941

2,267,126

UNITED STATES PATENT OFFICE 2,267,126

SPOOL

Henry Moretti, Cranston, R. I.

Application July 18, 1940, Serial No. 346,192

5 Claims. (Cl. 242—118)

This invention relates to a spool, more particularly the sort of spool which is made of cardboard; and has for one of its objects to provide a ferrule for attaching the head to the spool in a secure manner.

Another object of the invention is to provide a ferrule of such a construction that the same may be made by machine operations in an inexpensive manner.

Another object of the invention is to provide a ferrule of such construction that it will prevent relative rotation of the head and the barrel as well as securing the head and barrel in the desired assembled relation.

With these and other objects in view, the invention consists of certain novel features of construction, as will be more fully described, and particularly pointed out in the appended claims.

In the accompanying drawing:

Fig. 1 is an elevation, partly in section, of a spool;

Fig. 2 is an exploded view of a fragmental portion of one end of the barrel with the head separated therefrom, and the ferrule in position to be inserted into its secured position;

Fig. 3 is a perspective view of the ferrule alone;

Fig. 4 is a perspective view of the ferrule after it comes from the machine operations but before being folded for positioning in the spool;

Fig. 5 is a section on substantially line 5—5 of Fig. 1;

Fig. 6 is a blank of sheet metal stock from which the ferrule is formed with the first operation of slotting performed thereon.

Various ways of securing cardboard heads upon cardboard barrels to form spools upon which textile and other materials are wound are provided. Sometimes this securing means takes the form of a wooden plug, while other times it takes the form of a metal ferrule; or various other arrangements may be provided. In order to provide an improved ferrule which is exceedingly simple and may be manufactured in quantities by tools, I have formed up from sheet metal stock in a series of several striking or pressure operations a ferrule so formed that it is merely necessary to double the same upon itself prior to use. This ferrule has fins which assist in locking the same in place and preventing relative rotation of the head upon the barrel; and the following is a more detailed description of the present embodiment of this invention, illustrating the preferred means by which these advantageous results may be accomplished:

With reference to the drawing, I have illustrated a barrel 10 formed of cardboard or heavy paper, while the head 11 is formed of similar material, although it will be appreciated that the particular material is not of importance. The barrel 10 is tubular in form having a central opening 12 through the same, while the head 11 is provided with an opening 13 of a size substantially the same diameter as the opening 12 through the center of the barrel. The wall 14 of this opening is notched as at 15 at diametrically opposite locations for the reception of a particular ferrule for the securing of the parts together.

The ferrule is formed up from a ribbon of stock designated generally 17 and has several operations performed upon it. One of the first operations is that of providing an opening 18, or slot, as shown in Fig. 6. Another operation is that of forming the semicylindrical body portion 19 by dapping the same downwardly from the edge portions 20 which provide fins and then there will be formed flanges 21 at the ends of the stock; and a trimming operation is performed so that a device of the structure illustrated in Fig. 4 will be ejected from the machine. It is then merely necessary to bend the two sections 22 and 23 along the weakened joining portions 24 at the ends of the slot 18 so as to provide the ferrule designated generally 25 in Fig. 3 with the radially outwardly longitudinally extending fins 20 with the flanges 21 at the ends thereof; the portion 24 serving to join the inner ends and hold the parts in a convenient location for positioning through the head 11 so that the fins 20 will enter the notches 15 of the head and then will enter the stock of the barrel 10 as at 27, shown more fully in Fig. 5, these fins forcing themselves into the stock and preventing relative rotation of the parts one on the other.

Suitable protuberances 28 may be provided along the cylindrical body surface of the ferrule which will also additionally be forced into the barrel as at 29 in Fig. 1.

Glue is utilized along the outer body surface of the ferrule where it contacts with the inner surface of the barrel for assisting the holding of the parts in position. A very firm and solid structure is provided by this arrangement.

The foregoing description is directed solely towards the construction illustrated, but I desire it to be understood that I reserve the privilege of resorting to all the mechanical changes to which the device is susceptible.

I claim:

1. In a spool, a tubular barrel, a head abutting the end of the barrel having an opening registering with the opening through the center of the barrel and a notch in the edge of said head opening, a ferrule having an end flange to engage the outer surface of the head about said opening and extending through said opening and into the barrel to engage the inner surface thereof, and a fin on said ferrule extending into said notch and forced into the inner surface of said barrel to lock the parts in assembled relation.

2. In a spool, a tubular barrel, a head abutting the end of the barrel having an opening registering with the opening through the center of the barrel and diametrically opposed radial notches in the edge of said head opening, a ferrule having an end flange to engage the outer surface of the head about said opening and extending through said opening and into the barrel to engage the inner surface thereof, and fins on said ferrule extending into said notches and forced into the inner surface of said barrel to lock the parts in assembled relation.

3. For use in a spool comprising a tubular barrel and a head adapted to abut one end of said barrel, said head having a central opening matching the bore of said barrel, a ferrule formed of two semi-cylindrical sections each having a flange at one end thereof and outwardly turned marginal portions extending axially along the edges thereof, said sections being folded upon each other to form a cylindrical portion with said outwardly turned portions forming axially extending fins and said flanges forming a flange at one end of the cylindrical portion, said cylindrical portion being adapted to be forced through said central opening in said head flange and into the end of said barrel and to fit tightly therein with said axially extending fins embedded in the material of said barrel and with said flange against the outer surface of said head to hold the head in abutting engagement with said barrel.

4. The method of forming a ferrule for a spool which consists in cutting a blank from sheet stock with a lateral slot midway of its length terminating short of the edges, stamping said blank to form oppositely disposed semi-cylindrical sections in tandem, bending the stock at each free end to form a flange at each end, and folding two of said sections at said slot to cause their edges to abut with their flanges in the same plane and provide a cylindrical body ferrule with a flange at the end.

5. The method of forming a ferrule for a spool which consists in cutting a blank from sheet stock with a lateral slot midway of its length terminating short of the edges, stamping said blank to form a semi-cylindrical portion, and bending outwardly thereof marginal edge portions and end flanges, and folding said edge portions at said slot to cause them to abut and said flanges to align in the same plane.

HENRY MORETTI.